Nov. 3, 1925.
S. HINDS
FLUID PRESSURE MOTOR
Filed May 17, 1920
1,559,751
8 Sheets-Sheet 1
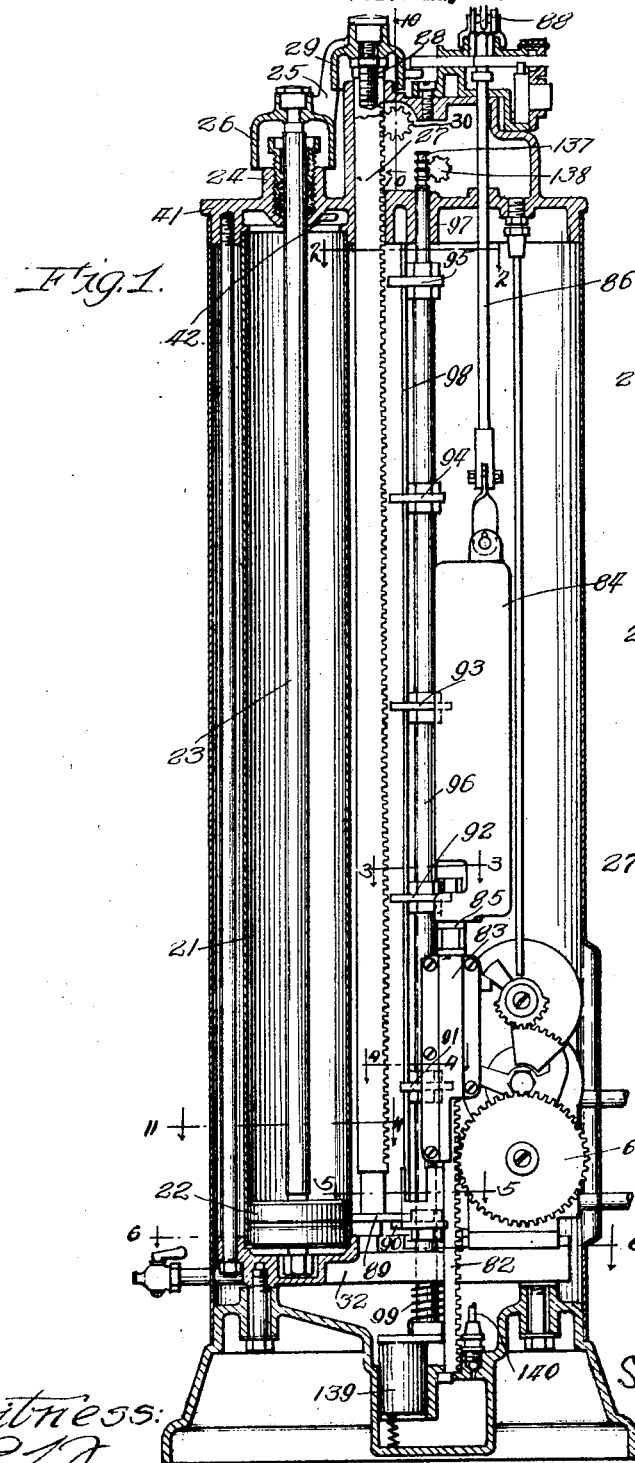
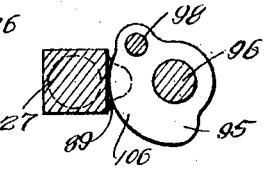
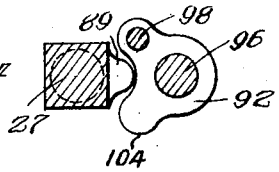
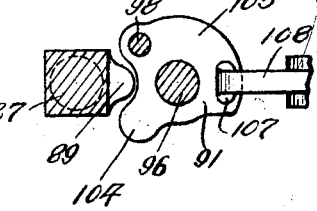
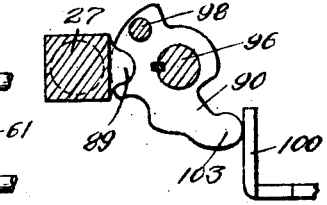
Inventor,
Sherwood Hinds
Charles M. Nissen
Atty.
Witness:
R. L. Carrington Nov. 3, 1925.  
S. HINDS  
FLUID PRESSURE MOTOR  
Filed May 17, 1920  
1,559,751  
8 Sheets-Sheet 2

Witness:  
R. C. Tarrington

Inventor,  
Sherwood Hinds  
By Charles M. Nissen  
Atty.

Nov. 3, 1925.
S. HINDS
1,559,751
FLUID PRESSURE MOTOR
Filed May 17, 1920
8 Sheets-Sheet 3
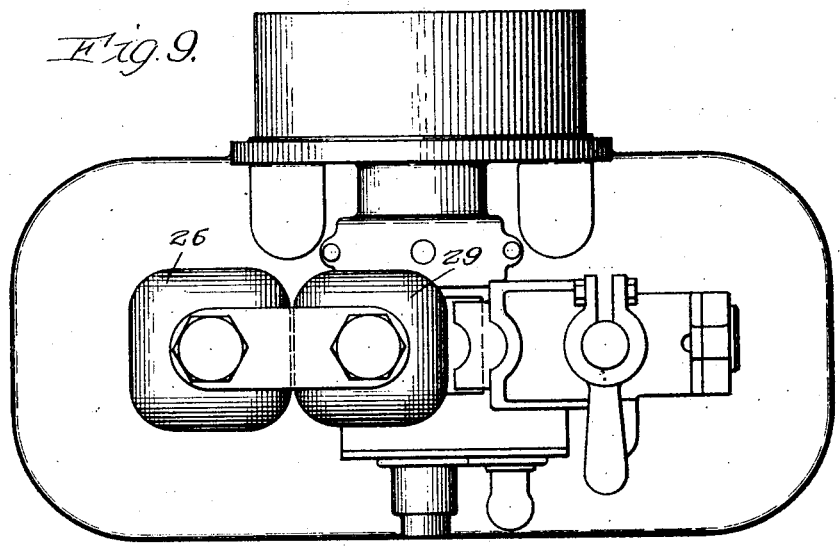
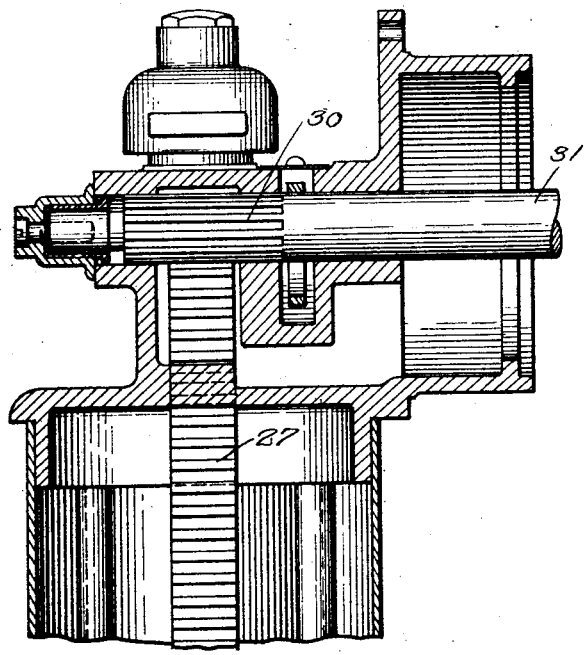
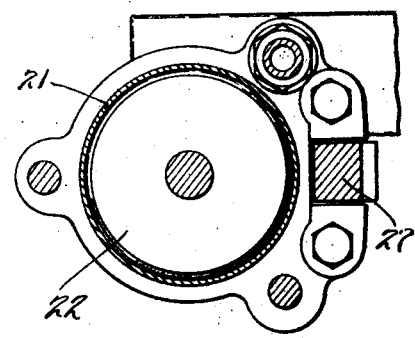
Inventor,
Sherwood Hinds
By Charles M. Nissen
Atty.
Witness:
R. L. Tarrington

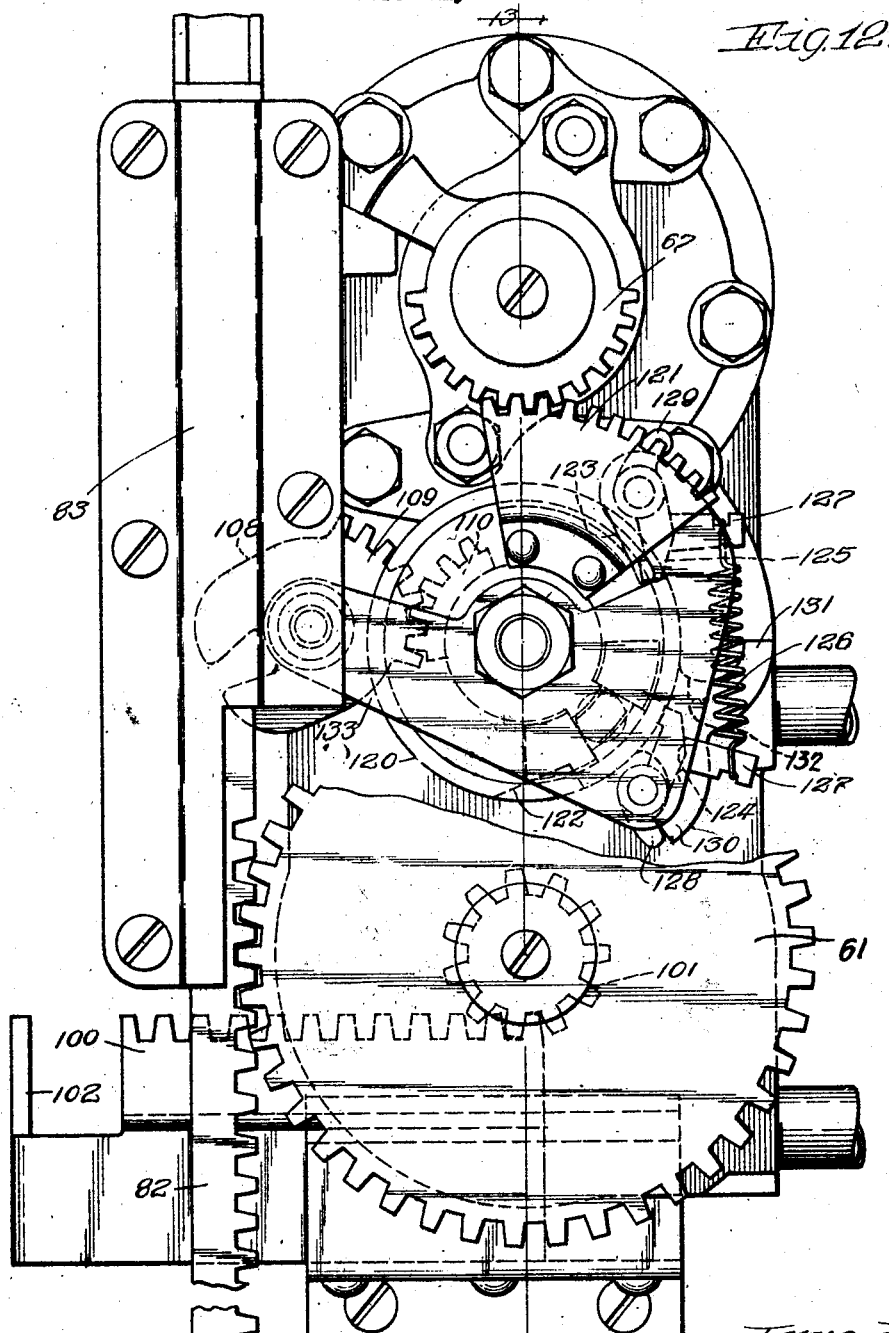

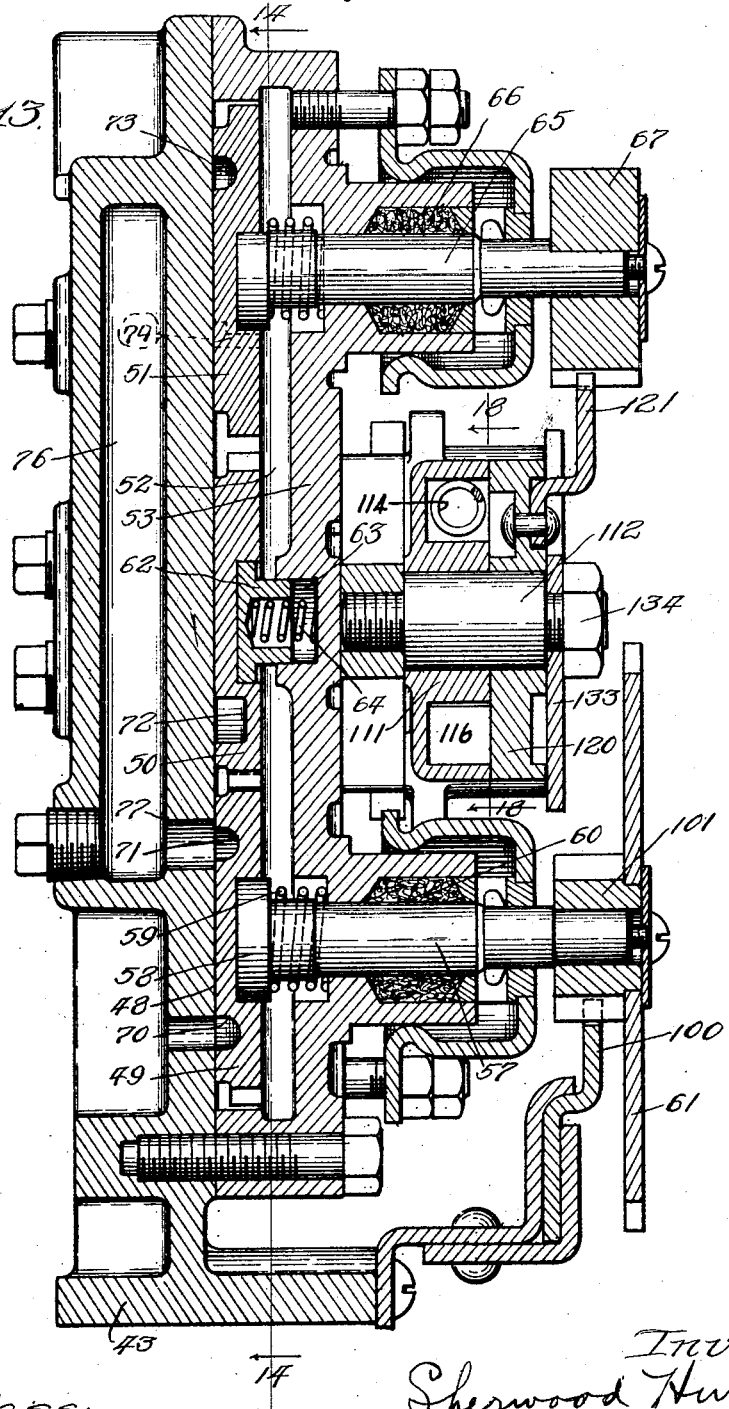

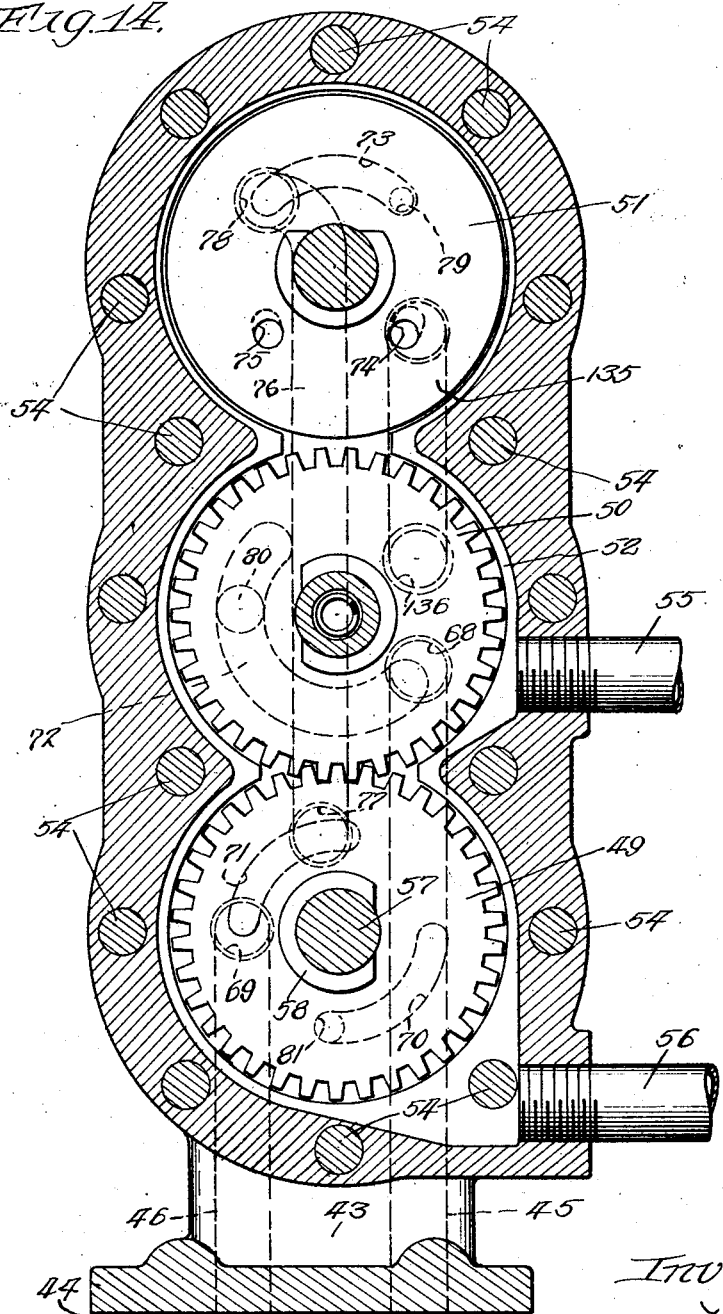

Nov. 3, 1925.
1,559,751

S. HINDS

FLUID PRESSURE MOTOR

Filed May 17, 1920 8 Sheets-Sheet 7

Witness:
R. L. Farrington

Inventor,
Sherwood Hinds
By Charles M. Nissen
Atty.

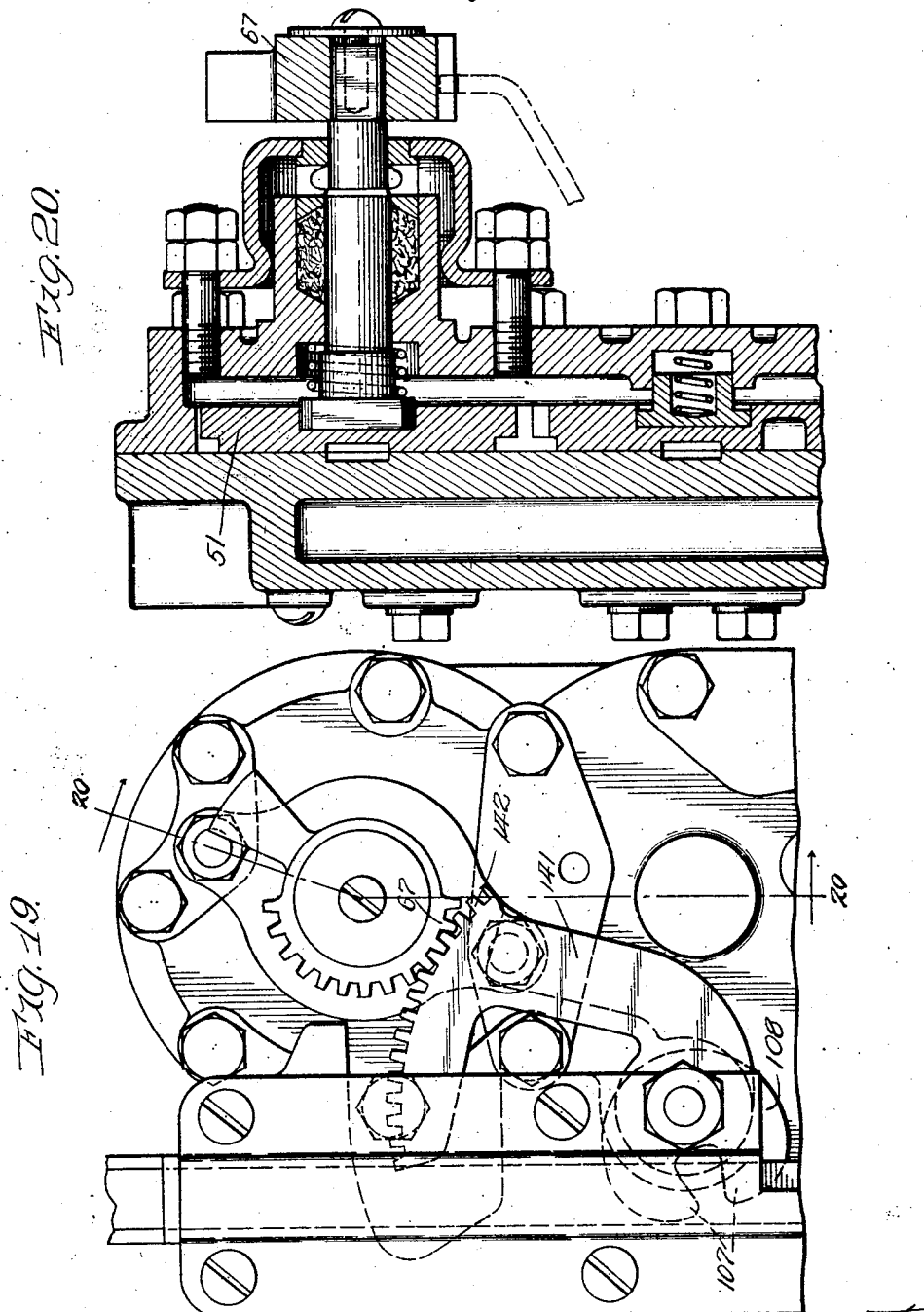

Patented Nov. 3, 1925.

1,559,751

UNITED STATES PATENT OFFICE.

SHERWOOD HINDS, OF FORT WAYNE, INDIANA, ASSIGNOR TO S. F. BOWSER & COMPANY, INC., OF FORT WAYNE, INDIANA, A CORPORATION OF INDIANA.

FLUID-PRESSURE MOTOR.

Application filed May 17, 1920. Serial No. 381,868.

*To all whom it may concern:*

Be it known that I, SHERWOOD HINDS, a citizen of the United States, residing at Fort Wayne, in the county of Allen and State of Indiana, have invented certain new and useful Improvements in Fluid-Pressure Motors, of which the following is a specification.

The invention has for its object the provision of a motor for operating liquid dispensing pumps and other devices which shall be of improved construction and operation.

The invention is exemplified in the combination and arrangement of the parts shown in the accompanying drawings and described in the following specification, and it is more particularly pointed out in the appended claims.

In the drawings—

Fig. 1 is a vertical section of a pump showing one embodiment of the present invention;

Fig. 2 is a fragmentary section on line 2—2 of Fig. 1;

Fig. 3 is a fragmentary section on line 3—3 of Fig. 1;

Fig. 4 is a fragmentary section on line 4—4 of Fig. 1;

Fig. 5 is a fragmentary section on line 5—5 of Fig. 1;

Fig. 9 is a top plan view of the motor shown in Fig. 1;

Fig. 10 is a vertical section on line 10—10 of Fig. 1;

Fig. 11 is a horizontal section on line 11—11 of Fig. 1;

Fig. 12 is a fragmentary elevation showing a portion of the mechanism illustrated in Fig. 1 but on a larger scale;

Fig. 13 is a vertical section on line 13—13 of Fig. 12;

Fig. 14 is a vertical section on line 14—14 of Fig. 13;

Fig. 19 is a fragmentary view similar to a portion of Fig. 12 but showing a modified construction; and Fig. 20 is a vertical section substantially on line 20—20 of Fig. 19.

Figure 6:
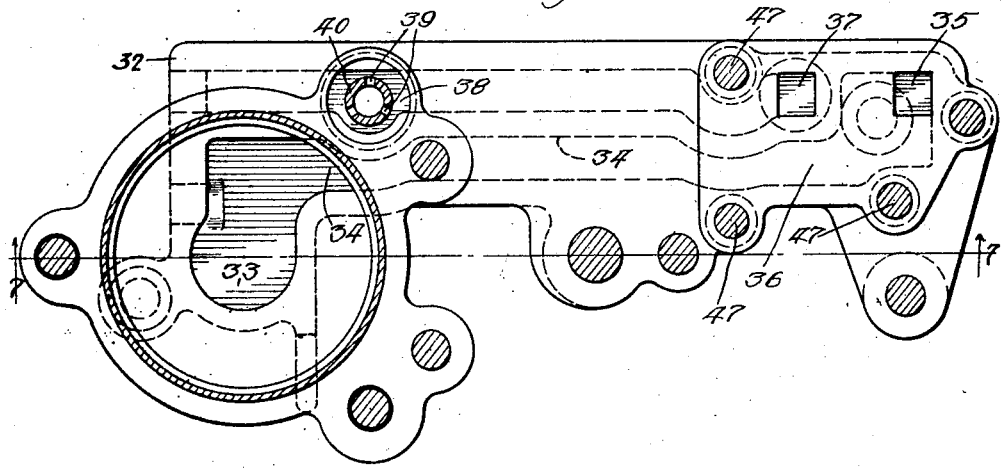
Fig. 6 is a horizontal section substantially on line 6—6 of Fig. 1 with parts omitted.

It is common practice in the dispensing of liquids, such as gasoline, to provide dispensing pumps having reciprocating pump rods which are usually provided with a rack driven by a pinion and operated by a hand crank or similar mechanism. In places where such pumps are installed compressed air is usually available as a motive force, and the present invention is adapted to make use of such motive force for operating the dispensing pumps. It is understood, of course, that the invention is capable of other applications, and the one referred to is cited by way of example.

In the embodiment of the invention illustrated a cylinder 21 is provided having a double-acting piston 22 connected to a piston rod 23 and arranged to reciprocate in the cylinder. A suitable stuffing box 24 is provided at the upper end of the cylinder and a bracket 25 is connected with the upper end of the rod 23 and carries a bell 26 which serves as a weather shield for the stuffing box 24. The bracket 25 is secured to a rack 27 by means of a threaded screw 28, and a bell 29 is formed on the bracket in position to shield the upper end of the rack 27. As shown more clearly in Fig. 10, the rack 27 meshes with a pinion 30 on a shaft 31. Where the motor is used for operating a dispensing pump the shaft 31 is connected with the operating shaft of the pump, or, may be made continuous with the pump-operating shaft. It will be apparent that the reciprocation of the piston 22 and the rod 23 will cause the rack 27 to reciprocate in unison therewith and thus impart rotation to the shaft 31 and drive the operating mechanism of the dispensing pump or other device connected with the drive shaft.

Figure 7:
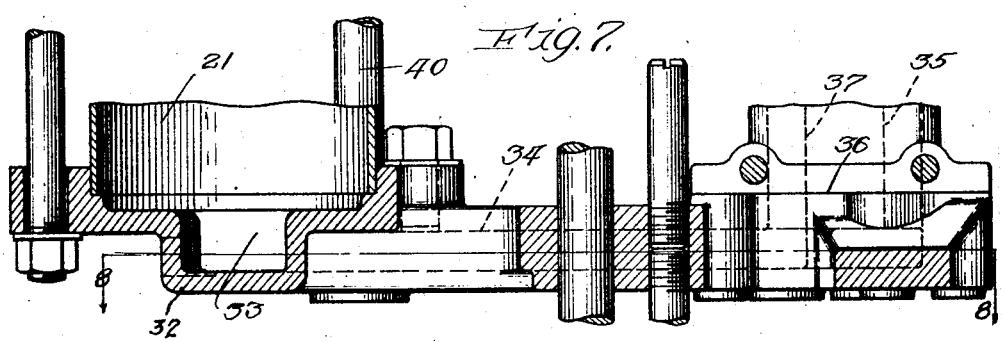
Fig. 7 is a vertical section on line 7—7 of Fig. 6.
Figure 8:
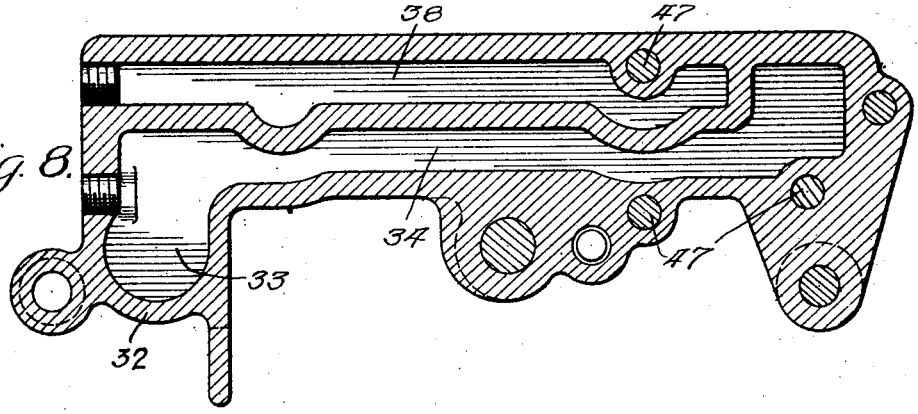
Fig. 8 is a horizontal section on line 8—8 of Fig. 7.

The lower end of the cylinder 21 is supported in a casting 32, shown best in Figs. 6, 7 and 8. A depression 33 is formed in the casting beneath the lower end of the cylinder 21 and is connected by a passage 34 with an opening 35 in the finished face 36 of the casting. A similar opening 37 is connected with a passage 38 which communicates through openings 39 with the interior of a tube 40 which forms one of the connecting rods between the lower casting 32 and an upper casting 41 which fits over the upper end of the cylinder 21, as shown in Fig. 1. The upper end of the tube 40 communicates with a port 42 opening into the upper end of the cylinder 21. In this way the opening 35 is connected to the lower end of the cylinder below the piston 22 while the opening 37 communicates with the upper end of the cylinder above the piston.

As shown in Figs. 13 and 14 a casting 43 is provided with a lower finished surface 44 which fits upon the upper face 36 of the casting 32 and is provided with passages 45 and 46 which register with the openings 35 and 37, respectively, in the face 36 of the casting 32. Suitable bolts 47 are provided for holding the two castings in firm contact with one another, and a gasket may be placed between the two finished faces 36 and 44 if found desirable.

As shown in Figs. 13 and 14 the casting 43 is provided with a vertical flat face 48 which forms the seat for circular rotary valves 49, 50 and 51. These valves are enclosed in a chamber 52 formed by a casting 53 which fits against the face 48 of the casting 43 and is held in place by suitable cap screws 54. Air under pressure is admitted to the chamber 52 through a hose connection or other conduit 55, and a second conduit 56 may be connected with the chamber 52 and provided with a valve or other closure which may be opened to permit the discharge of air from the chamber for cleaning or other purposes. A shaft 57 is journaled in the casting 53 and is provided with a disc 58 flattened at one side, as shown in Fig. 14, and fitting into a correspondingly shaped recess in the valve 49 to properly seat the valve on the surface 48 and cause the valve to rotate with the shaft. A spring 59 resiliently presses the valve against the surface 48 and the air pressure on the outer face of the valve also assists in holding the valve against the surface. A suitable stuffing box 60 is provided for the shaft 57, and the outer end of the shaft carries a spur gear 61 by which the shaft and valve are operated in a manner to be described. The valve 50 is properly centered and held in place against the face 48 of the casting 43 by a bushing 62 fitting in a recess 63 in the casting 53, and a spring 64 resiliently presses the valve against the surface 48. The valves 49 and 50 are provided with intermeshing gear teeth to cause them to rotate in unison with one another. The valve 51 is provided with a shaft 65 similar to shaft 57 and a stuffing box 66. The outer end of the shaft carries a spur gear 67 operated in a manner to be described. The movement of the valve 51 about its axis of rotation is independent of the valves 49 and 50.

As shown in Fig. 14, the passage 45 in the casting 43 leads to an opening 68 in the rear of the valve 50 which opens against the face of the valve 50 through the surface 48 of the casting 43. The passage 46 is provided with a similar opening 69 against the rear face of the valve 49. The valve 49 is provided with two arcuate grooves 70 and 71 which lie opposite one another and each is of approximately a quarter of a circumference. The rear face of the valve 50 is provided with an arcuate groove 72 extending for approximately half a circumference. The rear face of the valve 51 is provided with an arcuate groove 73 of approximately a quarter of a circumference. The valve 51 is provided with two perforations 74 and 75 extending through the valve and permitting pressure fluid from the chamber 52 to reach the face 48 of the casting 43. The casting 43 is provided with a vertically extending passage 76 having an opening 77 at the lower end communicating with the surface 48 of the casting 43 and a similar opening 78 at the upper end, the opening 78 being offset laterally from the center of the casting, as shown in Fig. 14. The casting 43 is provided with exhaust ports 79, 80 and 81 which extend from the surface 48 through the casting to the atmosphere. The valves and ports described control the admission and discharge of the compressed air from the chamber 52 to the cylinder 21 for operating the piston 22.

The gear wheel 61 which controls the valves 49 and 50 meshes with a rack 82, as shown in Figs. 1 and 12. The rack 82 reciprocates in a guide 83 and at its upper end is connected to a weight 84 having a stop 85 to limit its downward movement. A rod 86 is connected to the upper end of the weight 84 and passes upwardly to the upper end of the motor casing and is secured to a cable or chain 88 passing over suitable pulleys and guides to a position convenient to the operator. This chain will usually be carried to the point of discharge of the hose for the dispensing pump so that the operator may control the chain at the same time that he is directing the discharge of the liquid from the hose. When the operator by pulling on the cable 88 lifts the rack 82 the full extent of its movement the gear wheel 61 is given a half revolution in a clockwise direction, as viewed in Figs. 1 and 12. This will admit air under pressure to the cylinder 21 below the piston 22 in a manner to be described, and will cause the piston and rack 27 to be raised. The lower end of the rack 27 is provided with a contact plate 89 arranged to cooperate with a series of stops 90, 91, 92, 93, 94 and 95 carried by a control rod 96. The control rod 96 is journaled in the casing of the motor to oscillate about its axis and also to slide vertically a limited amount. As shown in Fig. 1, the control rod 96 is in its lowermost position and may be moved upwardly until the stop 95 engages the bearing 97 in the plate 41. The shapes of the various stops carried by the rod 96 are shown in Figs. 2 to 5, inclusive, and a single alining bar 98 extends through all of the stops to hold them from rotation on the control rod 96. One or more of the stops may be keyed to the rod 96, as shown in Fig. 5. The lower end of the rod 96 is provided with a spring 99 which normally tends to rotate the rod in a counterclockwise direction, as viewed from the upper end. The rod is turned about its axis against the tension of the spring 99 by a rack 100 meshing with a pinion 101 connected with the gear 61 to rotate in unison therewith. The rack 100 is provided with a laterally projecting flange 102 arranged to bear against an arcuate extension 103 on the stop 90. When the rack bar 82 is raised to rotate the gear 61 the rack 100 will be moved to the left, as viewed in Fig. 12, and will rotate the control rod 96 through approximately 90 degrees in a clockwise direction, as viewed in Figs. 2 to 5. As previously stated, the rotation of the gear 61 causes the piston 22 and the rack bar 27 to move upwardly and the movement of the control rod 96 by the rack 100 sets the stops 91, 92, 93 and 94 in a position to permit the upward movement of the rack bar 27 without engaging the contact plate 89. The stops 92, 93 and 94 are all similarly shaped, as illustrated in Fig. 3, and are each provided with a projection 104 which lies in the path of the contact plate 89 when the rod 96 is rotated 45 degrees from its normal position illustrated in Fig. 3. When, however, the rod is rotated approximately 90 degrees by a complete upward movement of the rack bar 82, the projections 104 will move beyond the path of the contact plate 89 thus providing an unobstructed path for the plate. The contact member 91, as shown in Fig. 4, is of a shape similar to that of the member 92 shown in Fig. 3, except that the portion of the stop 91 opposite the projection 104 is provided with an extended flange 105 which serves an additional purpose to be described. The operation of the stop 91 with relation to the rack 27 is exactly the same as that of the stops 92, 93 and 94. The stop 95, however, is provided with a continuous flange 106 which lies in the path of movement of the contact member 89 for all positions of the control rod 96.

When the rack bar 27 reaches its uppermost position the contact member 89 will strike the stop 95 and raise the control rod 96. This will reverse the action of the piston 22 in a manner to be described and will also form a positive limit for the movement of the rack bar 27. By this means the motor may be made to move a uniform amount at each stroke so that the quantities of liquid pumped by the different operations of the motor will be uniform.

Figure 18:
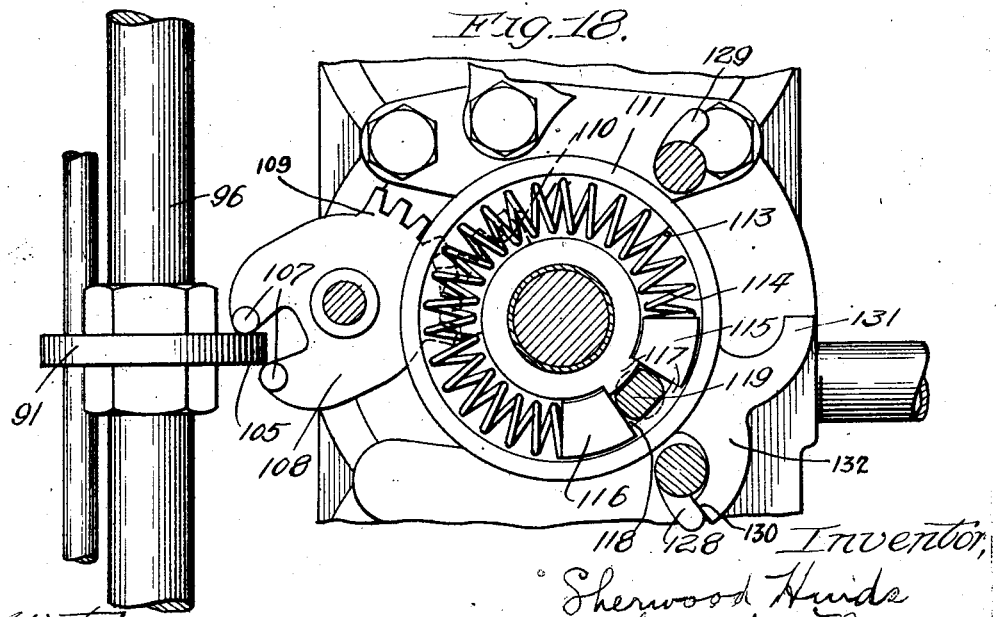
Fig. 18 is a fragmentary vertical section on line 18—18 of Fig. 13.

The reversal of the piston 22 by the movement of the control rod 96 when the rack bar 27 reaches its uppermost position is produced by the valve 51. The mechanism for operating this valve is illustrated in Figs. 12, 13 and 18. As shown in Figs. 4 and 18, the flange 105 on the stop 91 extends between a pair of jaws 107 on a rocker 108. The rocker 108 is provided with a gear segment 109 meshing with a gear segment 110 on an oscillatory member 111 pivotally mounted on a stud bolt 112 supported on the casting 53, as shown in Fig. 13. The oscillatory member 111 is provided with a circular groove or recess 113 forming a housing for a coil spring 114. The ends of the spring 114 bear against movable blocks 115 and 116 arranged to slide in the recess 113. A pair of lugs 117 project from the walls of the recess 113 and form stops for the blocks 115 and 116. A passage 118 is provided between the adjacent faces of the lugs 117 to receive the end of a pin 119. The pin 119 projects from the face of a disc 120 also pivoted on the stud shaft 112 and free to oscillate thereon. The disc 120 carries a gear segment 121 which meshes with the gear 67 on the shaft 65. The disc 120 is provided with notches 122 and 123 for receiving the holding ends of a pair of dogs 124 and 125, respectively. A coil spring 126 engages arms 127 on the dogs 124 and 125 and normally presses the dogs against the disc 120. The dogs 124 and 125 are provided with tailpieces 128 and 129, respectively, in position to be engaged by tappets 130 and 131 carried by a projection 132 on the oscillatory member 111. A plate 133 engages the outer end of the stud bolt 112 and is secured thereon by a nut 134. The plate 133 also forms a support for the outer ends of the pivotal mountings for the dogs 124 and 125 and the rocker 108. When the parts are in the position shown in Figs. 12 and 18 before the rocker 108 is actuated by the upward movement of the control rod 96 the dog 125 will be in engagement with the notch 123 to hold the disc 120 from movement in a counterclockwise direction, as viewed in these figures. When the rocker 108 is actuated by the movement of the control rod 96 at the upper end of the stroke of the piston 22 the oscillatory member 111 will be moved in a counterclockwise direction, as viewed in Figs. 12 and 18. This will cause the lugs 117 to carry with them the block 115 and thus compress the spring 114. The block 116 is held from movement by the pin 119 which is connected to the disc 120, the disc in turn being held by the dog 125. When the oscillatory member 111 has moved sufficiently to bring the tappet 131 into contact with the tailpiece 129, the dog 125 will be disengaged from the notch 123 and the disc 120 will be released. This will permit the spring 114 to expand and cause the block 116 to move the pin 119 and thus impart a partial rotation to the disc 120. The movement of the disc 120 will be transmitted by the segment 121 to the gear 67 imparting a quarter turn to the shaft 65 and the valve 51. In this way the final portion of the upward movement of the piston 22 compresses the spring 114 and stores up energy therein, which energy is released at the very end of the upward movement of the piston and caused to rotate the valve 51, which movement of the valve 51, as will be explained, reverses the direction of movement of the piston 22 in the cylinder 21. When the piston reaches the lower end of its stroke the contact plate 89 will engage the stop 90 on the lower end of the control rod 96 and will move the rod downwardly to return the rocker 108 to the position shown in Fig. 12. This return movement will again compress the spring 114 until the tappet 130 is caused to engage the tailpiece 128 of the dog 124. When this occurs the dog 124 will be released from the notch 122 and the disc 120 will be returned to the position shown in Fig. 12. This will return the valve 51 to its original position and cause the piston 22 to again move upwardly in the cylinder 21. It is thus apparent that the piston 22 will continue to reciprocate in the cylinder 21 and will be automatically reversed by the control rod 96 at each end of a stroke. As long then as the operation of the automatic reversing mechanism is not interfered with the motor will continue to operate the pump definite amounts at each stroke.

Figure 15:
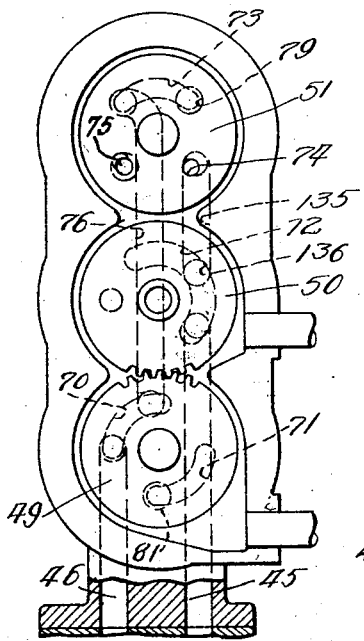
Figs. 15, 16 and 17 are views similar to Fig. 14 but on a somewhat smaller scale and showing the parts in different positions.
Figure 16:
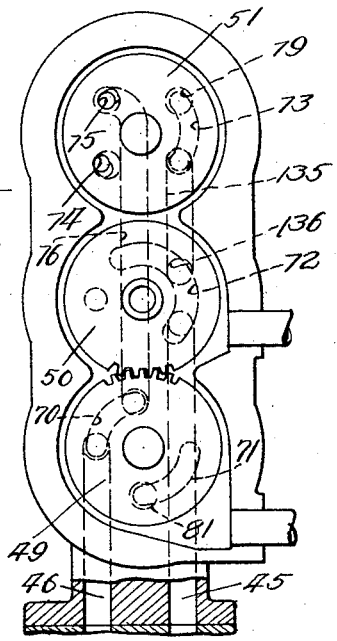
Figure 17:
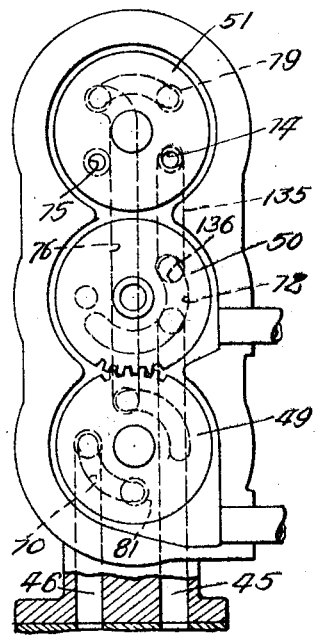

Starting and stopping of the motor is controlled by valves 49 and 50 in a manner which will best be understood from Figs. 14 to 17, inclusive. As previously explained, the passage 45 in the casting 43 communicates with the cylinder 21 below the piston 22, while the passage 46 communicates with the cylinder above the piston. When the control valves are in their normal inoperative position and the rack 82 and weight 84 are in their lowermost position, as shown in Fig. 1, the passages 45 and 46 will both be open to atmospheric pressure so that no pressure is exerted on either side of the piston 22. Under these conditions the valves will be in the position shown in Fig. 14 and the upper end of the passage 45 will communicate through the arcuate groove 72 in the valve 50 with the exhaust port 80. At the same time the passage 46 will communicate through the arcuate groove 71 in the valve 49 with the opening 77, and the passage 76 to the arcuate groove 73 in the valve 51, and thence to the exhaust port 79. When the operator pulls upon the cable 88 to the full extent of its movement the gear wheel 61 will be given a half revolution, thus moving the valve 49 180 degrees in a clockwise direction, and the valve 50 180 degrees in a counterclockwise direction, as viewed in Fig. 14. This movement will cause the grooves 70 and 71 in the valve 49 to interchange their positions and will shift the groove 72 in the valve 50 180 degrees. The resulting positions of the valves is illustrated in Fig. 15. This will permit air under pressure to enter through port 74 in valve 51 into a passage 135 in the casting 43 which communicates through an opening 136 to the rear of the valve 50. From this point the pressure will be transmitted through the groove 72 in the valve 50 to the passage 45, and thence to the lower end of the cylinder 21. At the same time the upper end of the cylinder is open to the atmosphere through the passages 46, 70, 76 and 73 and exhaust port 79. The pressure fluid entering the lower end of the cylinder will cause the piston 22 to be moved upwardly until the contact plate 89 strikes the stop 95 and causes a quarter revolution of the valve 51 in the manner previously described. When this occurs the opening 75 of the valve 51 and the groove 73 will be shifted 90 degrees in a clockwise direction, bringing the parts into the position shown in Fig. 16. Under these conditions the lower end of the cylinder 21 will now be connected through the passage 45, the groove 72, the passage 135, and the groove 73 with the exhaust port 79. At the same time the upper end of the cylinder will be connected to the passage 46, the groove 70, the passage 76 and the opening 75 with the compressed air in the chamber 52. This, of course, will permit the compressed air to enter above the piston 22 and positively return the piston to its lower position, whereupon the valve 51 will be again shifted, as previously explained, and this operation will continue as long as the operator continues to hold the cable 88 pulled outwardly to its extreme position. To discontinue the operation of the motor it is only necessary for the operator to release the cable 88. When this is done the weight 84 will return the rack 82 to its lowermost position and restore the valves to the position shown in Fig. 14 in which both ends of the cylinder 21 are connected with atmospheric pressure. It is apparent, therefore, that as soon as the cable 88 is released the operation of the motor will cease. It should be noted that in order to cause the motor to continue to operate a positive act on the part of the operator is required. In case of accident or in case the attention of the operator is distracted so that he ceases to attend to the work, the moment that the cable 88 is released because of the failure of the operator to continue to give his attention to the motor, the operation of the motor will be automatically discontinued.

The particular motor shown in the drawings is designed for pumping five gallons at each upward stroke of the piston and is adapted to drive a one-way pump so that on the return stroke no liquid is pumped. It will frequently happen, of course, that in filling a tank a quantity other than an exact multiple of five gallons will be desired and means must be provided for stopping the motor so that it will dispense measured quantities in multiples of units less than five gallons. The stops 91, 92, 93 and 94 shown in the drawings are provided for this purpose and are arranged for stopping the motor when any number of single gallons have been pumped. The motor, of course, may be arranged for smaller units, if desired, by providing a larger number of stops. If it is desired to stop the motor when three gallons, for instance, have been pumped, the operator holds the cable 88 in its outermost position until after two gallons have been discharged and then eases up on the cable an amount approximately half the total movement of the cable. When this is done the position of the valve 51 will not be affected but will continue in the position shown in Fig. 15. The gear 61, however, will be permitted to return approximately a quarter of a revolution toward its inoperative position, shifting the valve 49 approximately 90 degrees in a counterclockwise direction, and the valve 50 approximately 90 degrees in a clockwise direction, bringing the valves into the position shown in Fig. 17. At the same time the rack 100 will be retracted a distance equal to half of its entire movement and the spring 99 will be permitted to rotate the control rod 96 45 degrees in a counterclockwise direction. This will bring the projection 104 on the three gallon stop 93 into the path of the contact plate 89. The shifting of the valves 49 and 50 will not interfere with the continued upward movement of the piston 22, as will be apparent from Fig. 17, for when the valves are in the position shown in that figure air under pressure will be admitted to the lower end of the cylinder through opening 74, passage 135, groove 72 and passage 45. At the same time the upper end of the cylinder will be connected through passage 46, and groove 70 with exhaust port 81. The piston will, therefore, continue to move upwardly until the contact plate 89 engages the three gallon stop 93. When this occurs the control rod 96 will be actuated to shift the valve 51 into the position shown in Fig. 16. This will connect the passage 135 to the exhaust port 79, while the passage 46 continues in communication with exhaust port 81. The movement of the piston will, therefore, stop since both sides are subjected to atmospheric pressure. If after the piston has come to rest it should appear that the receptacle being filled would hold still another gallon the operator can again draw the cable 88 to its extended position which will bring the valves into the position shown in Fig. 16 and return the piston to its lowermost position where its operation will again be started after which it may be stopped when one, two or more gallons have been pumped.

The upper end of the control rod 96 may be provided with a series of circumferential rack teeth 137 which mesh with a pinion 138 having a hand-controlled wheel located outside the motor casing so that the rod 96 may be operated by hand to reverse the direction of the pump independently of the position of the piston 22 in case it becomes desirable at any time to so operate the valve. An oil pump 139 is shown in the base of the motor in position to be operated by the lower end of the control rod 96 when it is moved downwardly by the rack 27. This oil pump may be connected by a conduit 140 to any portion of the mechanism which requires a forced feed oiling system.

In Figs. 19 and 20 there is shown a slight modification of the mechanism for reversing the valve 51. In this form of the mechanism the rocker 108 is connected directly to an arm 141 which carries a gear segment 142 meshing with the pinion 67 which operates the valve 51. In this form of valve reversing mechanism the rotation of the valve is produced directly by the movement of the control rod 96 actuated by the piston 22 through the rack 27. It will be apparent from Figs. 15, 16 and 17 that the first part of the movement of the valve 51 will cut off the supply of compressed air from the piston 22 and that the continued movement of the piston to complete the reversal of the valve will depend upon the expansion of the air in the cylinder. Where the force of expansion is sufficient to secure this result the form of valve reversing mechanism shown in Figs. 19 and 20 affords a somewhat simpler arrangement than that of the mechanism previously described. The previously described mechanism, however, does not depend upon the expansion of the air in the cylinder for its operation for the reason that sufficient energy is stored in the spring 114 to effect the reversal of the valve before the reversing operation begins.

It will be seen that the motor may be controlled entirely by a single control member and that it provides a measured stroke which is positively stopped when the exact amount of movement has been reached. The motor also provides for automatically stopping the operation in case of accident or inattention on the part of the operator.

I claim:—

1. A motor comprising a piston, valve mechanism for controlling the operation of said piston, stops for arresting said piston after it has moved various measured amounts, means actuated by said stops for controlling said valve mechanism, and means for setting said valve mechanism to operate differently under the control of said stops when different ones of said stops are in operative position to limit the movement of said piston.

2. A motor comprising a reciprocating piston, a stop for limiting the movement of said piston, a valve for controlling the operation of said piston, and a single device for operating said valve and for moving said stop into and out of operative position.

3. A motor comprising a piston, a support having a plurality of stops thereon for limiting the movement of said piston, a valve for controlling the operation of said piston, and a single device for operating said valve and for actuating said stop support to shift the position of the stops thereon.

4. A motor comprising a piston, valve mechanism for controlling the operation of said piston, a support having stops thereon for limiting the movement of said piston, a single device for operating said valve and for shifting said support to move certain of the stops thereon into and out of operative position, means operated by said piston for engaging said stops, and means controlled by said stops for operating said valve mechanism to vary the movement of said piston.

5. A motor comprising a cylinder having a piston therein, a valve for controlling the admission of fluid under pressure to said cylinder to actuate said piston, a second valve for reversing the direction of movement of said piston in said cylinder, stops for limiting the movement of said piston to predetermined measured amounts, a support for said stops, and means controlled by one of said stops for actuating said second valve.

6. A motor comprising a cylinder, a piston in said cylinder, a valve for controlling the admission of fluid under pressure to said cylinder to move said piston, a second valve for controlling said fluid to reverse the direction of motion of said piston in said cylinder, a support having stops thereon for limiting the movement of said piston to predetermined measured amounts, a single device for operating said first-mentioned valve and for shifting said support to bring certain of said stops into and out of operative position, and mechanism controlled by certain of said stops when said support is in one position for operating said second-mentioned valve to automatically reverse the direction of movement of said piston at the ends of the stroke thereof, said mechanism being operable by a different one of said stops to cut off the supply of fluid from said cylinder when said support is moved to bring said last-mentioned stop into operative position.

7. The combination with a cylinder, of a piston movable therein, valve mechanism for controlling the movement of said piston in said cylinder, stops for controlling said valve mechanism, and a device for shifting said valve mechanism and simultaneously setting said stops.

8. The combination with a fluid pressure actuated device, of a valve for controlling the admission of fluid to said device, means for periodically actuating said valve to reverse the direction of motion of said device, valve mechanism for controlling the admission of fluid under pressure to said first-mentioned valve, and means for setting said valve mechanism in one position to permit periodic reciprocation of said device under the control of said first-mentioned valve and for setting said valve mechanism in another position to cause a discontinuation of the movement of said device when said first-mentioned valve is actuated.

9. The combination with a cylinder and a piston arranged to move therein, of valve mechanism for controlling the movement of said piston in said cylinder, and means for setting said valve mechanism in one position to cause periodic reciprocation of said piston and for setting said valve mechanism in a different position to arrest the movement of said piston at predetermined points in the path of movement thereof, said means being operable to cause renewal of the movement of said piston after such arrest.

10. The combination with a cylinder and a piston movable therein, of mechanism for controlling the movement of said piston in said cylinder, and means for setting said controlling mechanism movable into one position to cause periodic reciprocation of said piston and into a different position to arrest the movement of said piston at predetermined points in the path of movement thereof, said means being operable after said arrest to restore the movement of said piston.

11. The combination with a cylinder and a piston movable therein, of valve mechanism for controlling said piston, means controlled by the operator for setting said valve mechanism in position to cause movement of said piston, and means for automatically setting said valve mechanism in position to cause the movement of said piston to be discontinued whenever said operator controlled valve setting mechanism is released.

12. The combination with a cylinder and a piston arranged to move therein, of a control rod having a plurality of stops thereon, means actuated by said piston for engaging said stops, valve mechanism for controlling the admission of fluid under pressure to said cylinder, means for shifting said valve mechanism, and means for moving said control rod to change the position of said stops on said valve mechanism when said valve mechanism is shifted to cause different ones of said stops to cooperate with said piston for different positions of said valve mechanism.

13. The combination with a cylinder and a piston arranged to move therein, of valve mechanism for controlling the admission of fluid under pressure to said piston, a control rod having stops thereon, means actuated by said piston for engaging said stops to shift said control rod, means actuated by said control rod for shifting said valve mechanism when a stop on said rod is engaged by said piston actuated means, manually operated means for shifting said valve mechanism, and means for shifting said control rod to bring different stops into position to cooperate with said piston actuated means when said valve mechanism is shifted by said manually controlled means.

14. The combination with a cylinder and a piston arranged to reciprocate therein, of a valve for controlling the admission of fluid under pressure to said cylinder, a control rod having stops thereon, means actuated by said piston for engaging said stops, means actuated by said control rod when a stop is engaged by said piston actuated means to shift the position of said valve and cause a reversal of the direction of movement of said piston, valve mechanism for controlling the admission of fluid to said first-mentioned valve, stops arranged on said control rod intermediate said first-mentioned stops, and manually controlled means for shifting said control rod to bring one of said intermediately arranged stops into position to cooperate with said piston actuated means and to shift said valve mechanism to cause said first-mentioned valve to shut off the supply of fluid pressure from said cylinder when one of said intermediate stops is engaged by said piston actuated means.

15. The combination with a cylinder and a piston arranged to reciprocate therein, of a plurality of disc valves for controlling the admission of fluid under pressure to said cylinder, means actuated by said piston for shifting one of said valves to reverse the direction of movement of said piston in said cylinder when the other of said valves are in one position, manually operated means for shifting the said other valves to control the passages between said first-mentioned valve and said cylinder, and a device actuated by said manually operated means to cause said first-mentioned valve to be shifted by said piston at a point intermediate the ends of the stroke thereof when said other valves are set in one position by said manually operated means.

16. The combination with a cylinder and a piston arranged to move therein, of valve mechanism for controlling the movement of said piston in said cylinder, said valve mechanism comprising a pair of disc valves geared together to move in unison with one another, a third disc valve movable independently of said pair of valves, a member having a surface against which said valves are seated, said third valve having openings therein for admitting fluid under pressure to passages in said member while said pair of valves are provided with means for controlling said passages, means actuated by said piston for shifting said third valve, and manually operated means for shifting said pair of valves.

In testimony whereof I have signed my name to this specification on this 26th day of April, A. D. 1920.

SHERWOOD HINDS.